July 8, 1952  A. H. KATTERJOHN  2,602,427
PNEUMATIC DRILLING APPARATUS
Filed May 21, 1946  2 SHEETS—SHEET 1

AUGUST H. KATTERJOHN
INVENTOR

ATTORNEYS

July 8, 1952 A. H. KATTERJOHN 2,602,427
PNEUMATIC DRILLING APPARATUS
Filed May 21, 1946 2 SHEETS—SHEET 2
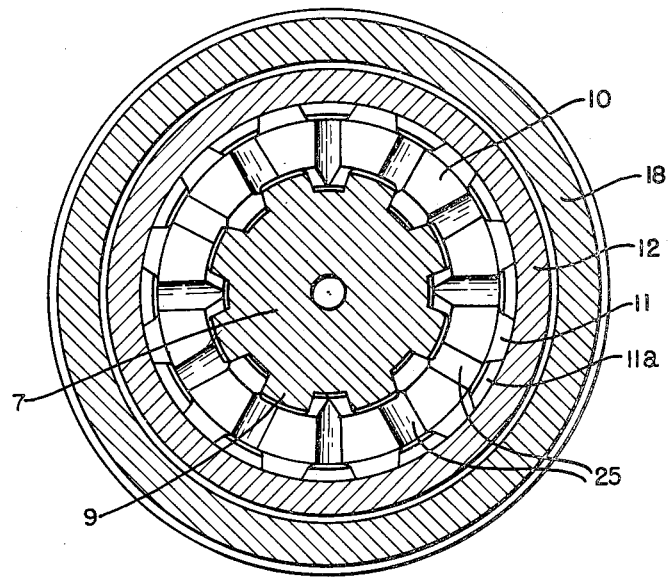
FIG. 3
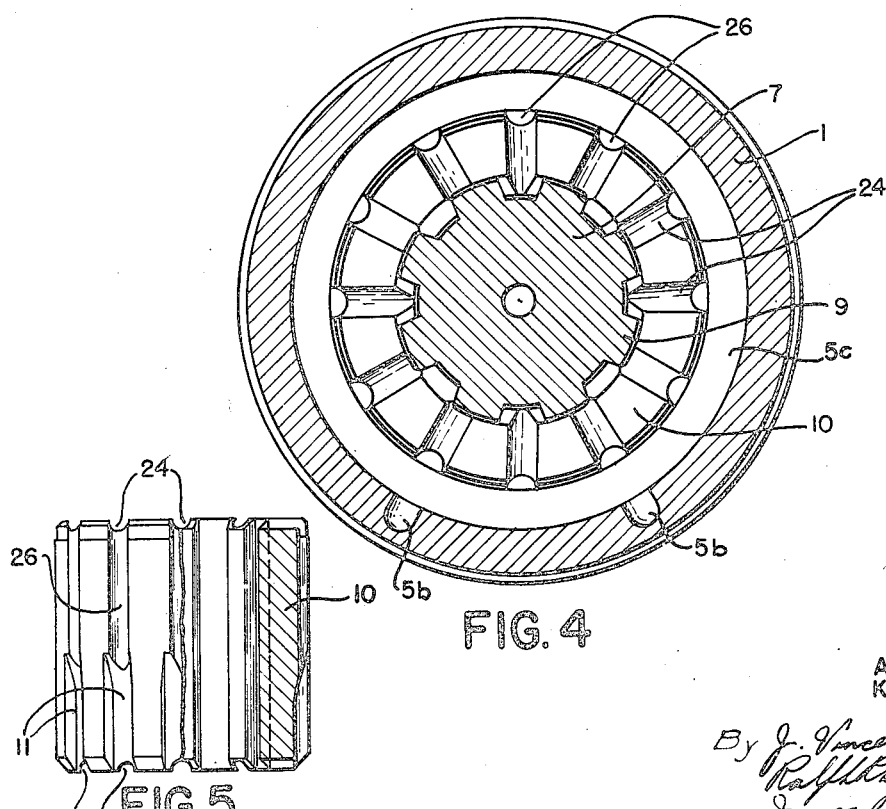
FIG. 4
FIG. 5
AUGUST H.
KATTERJOHN
INVENTOR
ATTORNEYS Patented July 8, 1952

2,602,427

UNITED STATES PATENT OFFICE 2,602,427

PNEUMATIC DRILLING APPARATUS

August H. Katterjohn, Houston, Tex., assignor to Reed Roller Bit Company, Houston, Tex., a corporation of Texas Application May 21, 1946, Serial No. 671,195

5 Claims. (Cl. 121—7)

This invention relates to pneumatic drilling tools customarily known as rock drills and has for its general object the provision of such a tool in which the expense involved in replacements necessitated by wear in the driving connections will be minimized, and in which better provision will be made for blowing through the drill steel.

In previous structures attempts have been made to reduce the expense of replacements due to wear, with particular emphasis directed toward avoiding the necessity for the replacement of large and expensive parts such as the main working cylinder casting. These attempts in the past have for the most part taken the form of replaceable portions which might be termed liners, inserted in the ends of the cylinder castings and in the interiors of the members ordinarily disposed in splined engagement with the driving pistons for the transmission of rotary movement from these pistons to the drill steels.

Such arrangements, however, were expensive in that a larger number of parts was required and their only effect was to reduce the sizes of the parts requiring replacement. The frequency of replacement was not reduced nor was replacement facilitated. On the contrary, replacement was many times more difficult because of the necessity of removing the liners or inserts from the parts in which they were mounted. Furthermore, the members thus inserted for splined engagement with the driving pistons for transmitting rotary motion therefrom were in some cases threadedly mounted in the members in which they were placed, and were subject to coming loose in some cases, becoming so tight in other cases that they could not be removed, and in still other cases becoming so tight that they induced breakage in the parts in which they were mounted.

Provision for blowing air through the drill steel in such previous constructions has taken the form of passages drilled longitudinally through the wall of the cylinder casting to a point beyond the driving sleeve or has taken the form of passages drilled through the driving sleeve longitudinally, or loose fits between the driving sleeve and the cylinder casting. In the case of passages drilled through the walls of the cylinder casting or through the driving sleeve longitudinally these parts had to be made thicker in order to provide adequate strength and this was objectionable. This was particularly true in the case of composite driving sleeves made up of a steel shell with a softer metal insert threaded into it because in such sleeves the steel shell was stressed longtiudinally in operation. The use of poor fits between the driving sleeve and the cylinder casting has proved unsatisfactory in that it does not allow the passage of a sufficient amount of air, and the loose fit is objectionable as such.

A more specific object of this invention therefore is to provide a structure of the type referred to in which the number of parts requiring replacement due to wear occasioned by the transmission of rotary movement from the piston to the drill bit will be reduced to a minimum.

Another object of this invention is to provide a structure of the type referred to in which substantially all of the wear occasioned by the transmission of such rotary movement will be taken on one readily replaceable element.

Another object of this invention is to provide a single transmission element which will take a major portion of wear occasioned by the transmission of rotary movement from the piston to the drill bit, and which will be relatively cheap and easy to manufacture and easy to replace.

Another object of this invention is to provide a means for transmitting rotary movement from the piston to the drill bit by which the interruptions due to breakage will be reduced to a minimum and the time and expense of replacements due to wear will likewise be reduced to a minimum.

Another object of this invention is to provide an arrangement for transmitting rotary movement from the piston to the drill bit in such a structure, by which arrangement the parts will be maintained in more perfect alignment than the previous arrangements.

A further object of this invention is to provide a single readily replaceable element for the transmission of rotary movement from the piston to the drill bit, which element may be accurately fitted to all the parts with which it cooperates and yet which is capable of providing for the passage of large amounts of blowing air from its rear to its forward end and into the passage through the drill bit or drill steel.

Other objects and advantages of this invention will become apparent from the following description taken in connection with the accompanying drawings wherein is illustrated by way of example one embodiment of the invention.

In the drawings:

Fig. 3 is a transverse cross section taken along the line 3—3 of Fig. 2.

Fig. 4 is a transverse cross section taken along the line 4—4 of Fig. 2.

Fig. 5 is a view partly in side elevation and partly in longitudinal cross section showing the transmission sleeve constructed in accordance with the present invention and illustrated in Figs. 2, 3 and 4 in position within the drill.

Figure 1:
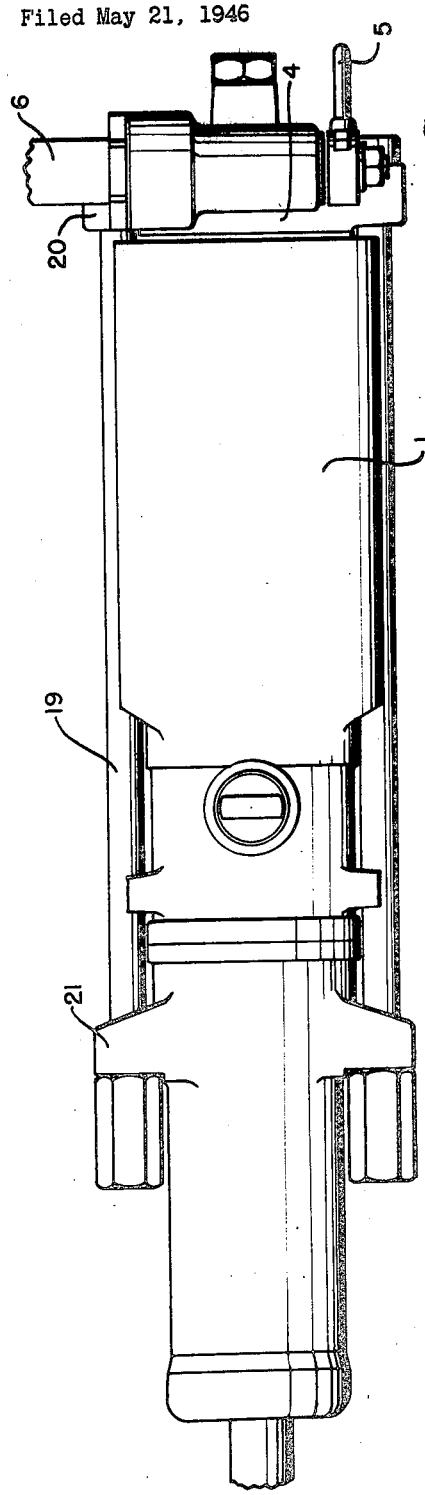
Fig. 1 is a top plan view of a rock drill constructed in accordance with this invention.
Figure 2:
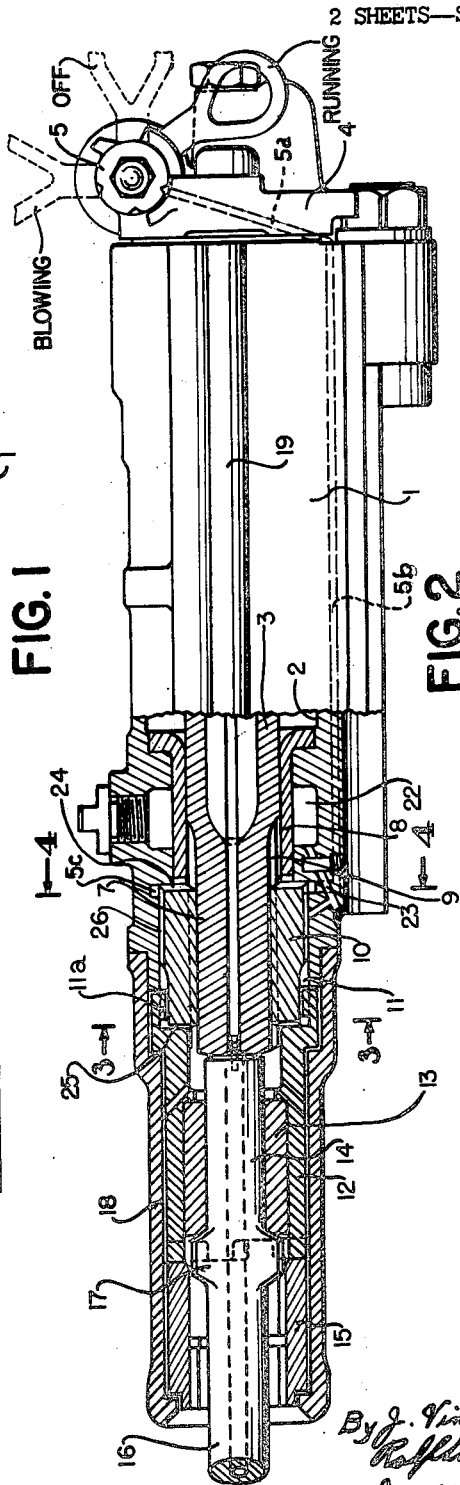
Fig. 2 is a view partly in side elevation and partly in longitudinal cross section illustrating a portion of the inner construction of the drill shown in Fig. 1, and particularly the arrangement to which this invention relates.

Referring more in detail to the drawing, the invention is illustrated as embodied in a rock drill having a cylinder member or casting 1 with a power cylinder 2 formed therein and a hammer or driving piston 3 which reciprocates within the cylinder. The rear end of the cylinder 2 is closed in the customary manner by the back head 4 which has a manually controlled throttle valve 5 mounted thereon for the purpose of controlling the ingress of live air through the hose 6 from the source of supply. This valve has a handle which as illustrated may occupy any one of three positions, the lower position which is shown in solid lines in Fig. 2 being the position occupied by the valve handle for normal running of the drill, the intermediate dotted line position being the position of the valve handle for shutting off the supply of live air, and the uppermost dotted line position being the position of the valve handle in which the supply of live air is conducted through passageways 5a and 5b provided in the back head 4 and in the wall of the cylinder casting 1 and opening into the interior of the cylinder casting into a groove or annular chamber 5c. This provides a supply of live air when desired to a point on the interior of the cylinder casting 1 adjacent its forward end for a purpose presently to be described. Suitable valve mechanism which may be of conventional design, is provided for causing the live air to act first upon one face and then upon the other face of said piston causing the piston to reciprocate within the cylinder. Conventional means also may be provided for causing the piston 3 to rotate a fraction of a revolution each time it moves to its rearmost position after it has made a power stroke, all in a well-known manner. The purpose of this rotation is to rotate the drill steel in the manner hereafter to be described.

Projecting forwardly from the hammer piston 3 is an integral power plunger 7 adapted to reciprocate within the bearing bushing 8 carried in the forward portion of the cylinder casting. The forward end of this plunger is splined at 9 and adapted to fit slidingly within the splined or rifled interior of the rotary chuck rotation sleeve or transmission sleeve 10 which is preferably of bronze or some other bearing material softer than the plunger 7 and the cylinder casting which are usually of steel. This sleeve 10 is mounted within the forward end of the cylinder casting for rotary but not for longitudinal movement. The rotary transmission sleeve or drive bushing 10 is also provided with shallow splines on its outer surface adjacent its forward end as shown at 11 for the purpose of receiving in a tight splined telescoping engagement the internal splines 11a provided in the enlarged rear end portion of the chuck sleeve or guide bushing 12. This guide bushing 12 usually also of steel, receives a bearing bushing 13 of bearing metal forming a bearing for the rear end of the drill steel shank 14. Locked to rotate with the guide bushing 12 by means of interfitting teeth at the forward end of the bushing 12 is an internally splined chuck 15 adapted to receive and force the rotation of the drill steel 16 through interengagement with the laterally projecting lugs 17 on the drill steel. The bushing 12 and chuck 15 are held in place and rotatably mounted within the front head 18.

The front head 18 and the back head 4 are held against the opposite ends of the cylinder in the conventional way by means of tie rods 19 engaging with lugs 20 on the back head and lugs 21 on the front head.

The greatest advantages of the present invention result from the use of the chuck sleeve, rotary drive bushing or transmission sleeve 10 which is shown more in detail in Figs. 3, 4 and 5. The cylinder casting 1 is customarily formed of steel or the like, as is also the plunger 7 formed integrally on the forward end of the piston. The interior of the cylinder casting is guarded against wear due to reciprocation of the plunger by means of the bushing 8, and this bushing likewise serves to form an inner wall for the annular lubricant chamber 22 from which lubricant is adapted to flow through the passages 23 into the bearing between the sleeve 10 and the interior of the forward end of the cylinder housing.

The sleeve 10 is of a material softer than the material of the plunger 7 and the cylinder 1 so as to guard these parts 7 and 1 against wear and cause substantially all of the wear to take place on the readily replaceable sleeve 10. No specific hardness can be assigned to the sleeve 10 but it should not be harder than the cylinder and plunger surfaces it contacts. The softest material of which these surfaces would probably be made would be 250 Brinell, so that the sleeve 10 should be of bearing material softer than 250 Brinell if it is intended to be used with a cylinder and plunger of minimum hardness.

In addition to the splines provided within and upon the sleeve 10 for engagement with the plunger 7 and the sleeve 12 respectively, this sleeve may be provided on its end surfaces with grooves 24 and 25 which serve as lubricant grooves during operation of the drill and as passages for blowing air when drilling is halted and it is desired to blow air through the drill steel to clean out the bore hole. Along its outer surface the sleeve 10 is provided with similar groves 26 serving the same purposes as grooves 24 and 25. Thus lubricant from the annular chamber 22 may be distributed over the entire outer bearing surface of the rotary transmission sleeve during operation of the drill, thereby still further reducing wear thereon, and when drilling is halted and blowing is desired, live air from the chamber 5c may pass through the grooves 24 and thence between the splines 9, as well as through the grooves 26, splines 11 and grooves 25 to the space at the forward end of the plunger 7. Thence it may pass directly into the rear end of the longitudinal passage through the drill steel. The grooves 26 will not dangerously weaken the sleeve 10 because the metal of the sleeve 10 is stressed principally in shear during operation and in a direction and location not affected by the grooves 26.

It is to be noted that in operation longitudinal movement of the rotary transmission sleeve will be prevented by engagement between its rear end surface and a shoulder provided therefor in the cylinder casting and its forward end surface and a shoulder provided therefor in the sleeve 12. The sleeve 10 will receive rotary movement from the plunger 7 through the splines 9, and transmit it to the sleeve 12 through the splines 11. It is further noted that the splined engagement between the rotary transmission sleeve 10 and the sleeve 12 serves to accurately center the sleeve 12 and align it with the sleeve 10. This provides an accurately centered bearing for the shank end of the drill steel thereby accurately lining it up with the forward end of the plunger 7 at all times, and resulting in smoother operation.

It is further to be noted that the sleeve 10 can be cheaply and easily made since it has only a cylindrical and two end rotary bearing surfaces and one sliding and one tight splined portion. No threads or the like are necessary.

Furthermore, the sleeve 10 is easily replaceable, it being necessary only to remove the tie rods 19, take off the front head with the chuck, etc., and remove and replace the sleeve 10.

Having described my invention, I claim:

1. In a rock drill, a cylinder having a piston reciprocating and rotating therein formed with a splined plunger, a drill steel to be driven axially and rotated by said plunger, means including a guide bushing for transmitting rotation from said plunger to said drill steel; the improvement which comprises a single rotary transmission sleeve in splined engagement with said plunger to receive rotary movement therefrom and in interlocking engagement with said guide bushing to transmit rotary movement thereto, and in rotary bearing engagement with the interior of the front end portion of said cylinder, said sleeve being of bearing material softer than said plunger and cylinder member.

2. In a rock drill, a cylinder having a piston reciprocating and rotating therein formed with a splined plunger, a drill steel to be driven axially and rotated by said plunger, means including a guide bushing for transmitting rotation for said plunger to said drill steel; the improvement which comprises a single rotary transmission member in sliding splined engagement with said plunger to receive rotary movement therefrom and in splined engagement with said guide bushing to transmit rotary movement thereto, and in rotary bearing engagement with the interior of the front end portion of said cylinder, said transmission member being of bearing material softer than said plunger and cylinder member.

3. In a rock drill, a cylinder having a piston reciprocating and rotating therein formed with a splined plunger, a drill steel to be driven axially and rotated by said plunger, means including a guide bushing for transmitting rotation from said plunger to said drill steel; the improvement which comprises a single rotary transmission sleeve in sliding splined engagement with the splines on said plunger to receive rotary movement therefrom and in splined engagement with one end portion of said guide bushing to transmit rotary movement thereto, and in rotary bearing engagement with the interior of the front end portion of said cylinder, said sleeve having its surfaces which are in such splined and rotary bearing engagement of bearing material of different hardness than the parts engaged by such surfaces.

4. In a rock drill a cylinder having a piston reciprocating and rotating therein formed with a splined plunger, a drill steel to be driven axially and rotated by said plunger, means including a guide bushing for transmitting rotation from said plunger to said drill steel; the improvement which comprises a single rotary transmission sleeve in splined engagement with said plunger to receive rotary movement therefrom and in splined engagement with said guide bushing to transmit rotary movement thereto, and in rotary bearing engagement with the interior of the front end portions of said cylinder, said sleeve being of bearing material softer than said plunger and cylinder member, and having longitudinal passageways formed therein for conducting blowing air from the rearward to the forward end of the sleeve.

5. As a sub-combination, an integral transmission sleeve for a rock drill, said sleeve having its bore splined to receive a splined plunger and receive rotary motion therefrom, thrust bearing surfaces on the opposite ends of said sleeve, an exterior circumferentially extending bearing surface adapted to provide a bearing for rotary movement of the sleeve, and splines adjacent one end of the sleeve providing a driving connection for transmitting rotary movement from the sleeve, said thrust bearing surfaces having radial blowing air grooves therein and said circumferentially extending bearing surface having longitudinal blowing air grooves therein.

AUGUST H. KATTERJOHN.

REFERENCES CITED

The following references are of record in the file of this patent:

UNITED STATES PATENTS

| Number | Name | Date |
| --- | --- | --- |
| 1,623,411 | Hulshizer | Apr. 5, 1927 |
| 1,668,830 | Stevens | May 8, 1928 |
| 1,700,419 | Penberthy | Jan. 29, 1929 |
| 1,869,595 | Katterjohn | Aug. 2, 1932 |
| 1,968,376 | Curtis | July 31, 1934 |
| 2,049,126 | Maybach | July 28, 1936 |
| 2,108,989 | Mack | Feb. 22, 1938 |
| 2,291,851 | Wahlberg et al. | Aug. 4, 1942 |